United States Patent [19]

Sachs et al.

[11] 3,746,793

[45] July 17, 1973

[54] TELEPHONE COMMUNICATION SYSTEM FOR THE HEARING IMPAIRED

[75] Inventors: Reynold M. Sachs; Henri P. Boutin, both of McLean, Va.; Frank Cicchiello, Norristown, Pa.

[73] Assignee: Phonics Corporation, Washington, D.C.

[22] Filed: Aug. 9, 1972

[21] Appl. No.: 279,228

[52] U.S. Cl. ...... 179/2 DP, 340/324 AD, 179/2 TV

[51] Int. Cl. .......... H04m 11/06

[58] Field of Search .......... 178/6.8; 340/324 AD, 340/152, 365, 149 A; 179/2 DP, 2 R, 2 TV, 2 A; 235/92 AC, 92 PD, 101, 61.7 B

[56] References Cited

UNITED STATES PATENTS

| | | | |
|---|---|---|---|
| 3,017,625 | 1/1962 | Evans | 340/324 |
| 3,457,371 | 7/1969 | Sharon | 179/2 DP |
| 3,502,812 | 3/1970 | Litofsky | 179/2 TV |
| 3,582,554 | 6/1971 | Le Blang | 179/2 DP |
| 3,614,766 | 10/1971 | Kievit | 340/324 A |
| 3,631,457 | 12/1971 | Hamada | 340/324 A |
| 3,345,458 | 10/1967 | Cole | 340/324 A |
| 3,659,284 | 4/1972 | Rusch | 178/6.8 |
| 3,401,396 | 9/1968 | Wolf | 179/2 DP |
| 3,403,225 | 9/1968 | Mislan | 179/2 R |
| 3,417,202 | 12/1968 | Kolpek | 179/2 R |
| 3,685,039 | 8/1972 | Flanagan | 340/324 AD |
| 3,659,285 | 4/1972 | Baer | 340/324 AD |
| 3,659,283 | 4/1972 | Ophir | 340/324 AD |
| 3,665,408 | 5/1972 | Erdahl | 340/324 |

*Primary Examiner*—Kathleen H. Claffy
*Assistant Examiner*—Thomas D'Amico
*Attorney*—Morris Liss

[57] ABSTRACT

A keyboard entry terminal generates character codes in response to an operator's key selections. The code is transmitted to voice grade telephone lines through an acoustic coupler with a telephone receiver cradled thereon. An ordinary television receiver is connected to the terminal to display the operator's message as it is typed on the keyboard. An identical terminal is located at the other end of the telephone lines so that the code transmitted over the lines is received by the remote terminal through its acoustic coupler, upon which the receiving station telephone receiver is similarly cradled. Again, an ordinary TV receiver is connected to the terminal at the receiver station for the display of the incoming message. Transmission from the receiver station can then take place as outlined above.

7 Claims, 4 Drawing Figures

United States Patent [19]
Sachs et al.
[11] 3,746,793
[45] July 17, 1973
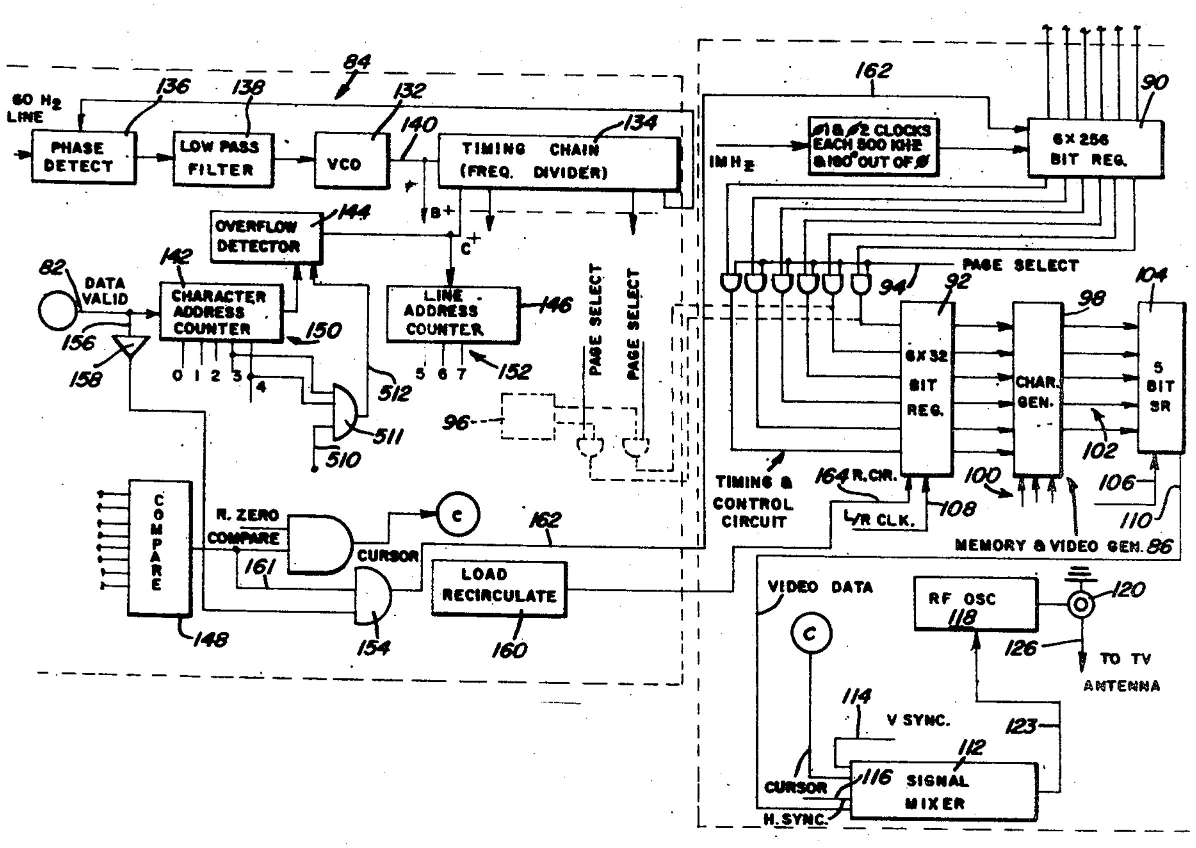

TELEPHONE COMMUNICATION SYSTEM FOR THE HEARING IMPAIRED

FIELD OF THE INVENTION

The present invention relates to telephone communication systems, and more particularly to communication systems utilizing electronic keyboard entry systems and cathode ray tube displays.

BRIEF DESCRIPTION OF THE PRIOR ART

Before the advent of the teletypewriter, the hearing impaired could only communicate in three ways. For persons communicating at a distance, the written word had to suffice. In vis *a'* vis communication, the most prevalent method is finger spelling and/or sign language. When it is necessary for a hearing impaired person to "listen" to another individual with normal hearing, this must be done by lip reading. However, it should be noted that lip reading is an extremely difficult talent to perfect and therefore, relatively few of the hearing impaired can lip read with proficiency.

With the advent of the teletypewriter, the hearing impaired have made use of teletypewriters to communicate over voice grade telephone lines. The teletypewriters so being used do not have a standard typewriter keyboard, but rather a truncated, 32 key keyboard. The teletypewriter generates "hard copy" messages being set and received.

However, the teletypewriter has several basic disadvantages for this use by the hearing impaired. The first disadvantage resides in the relatively high cost for a teletypewriter telecommunications system. In addition to its relatively high initial cost, the teletypewriter, which is electromechanical, requires continued maintenance and replacement of parts. Moreover, the teletypewriter requires installation which can only be performed by a trained, qualified electrician.

An additional disadvantage of the teletypewriter becomes manifest in the home and office environment where persons are present who have normal hearing. Particularly, the noise generated during the operation of a teletypewriter is bothersome and annoying to persons who can hear the constant highly audible clatter of the machine.

Lastly, due to its large size and substantial weight, the teletypewriter is in no sense a portable, or even mobile, unit. The teletypewriter, requiring a rather permanent installation, cannot conveniently be relocated to another location.

BRIEF DESCRIPTION OF THE INVENTION

The present invention is directed to a modified keyboard entry system, in the form of a computer keyboard terminal as described in copending application Ser. No. 279227 by Moyer et al.

Basically, the terminal consists of a keyboard that generates binary electronic codes in response to key actuation by an operator. These signals are transmitted to a conventional telephone through an acoustic or inductive coupler that is integrally mounted to the keyboard. The generated codes are then sent over voice grade telephone lines to another party that has a similar terminal. The electronics at the receiving terminal translates the code to a signal that can be displayed on a cathode ray tube. During the entry of a message onto the keyboard, the message becomes generated upon a cathode ray tube interfaced with the transmitting terminal. Thus, the transmitted and received messages between the two communicating parties are displayed on a video medium, rather than through a "hard copy" printout.

Circuitry is provided in the present invention to allow the generation of the video display on an ordinary television receiver, without modification or reconnections within said receiver. A connection is made between the keyboard entry terminal and the VHF antenna terminals of the television receiver.

Accordingly, rather than employing a relatively expensive commercial CRT monitor, a person with a hearing impairment can employ an ordinary household television that he already has as his video display.

The present terminal is entirely electronic and therefore, its operation is essentially noiseless. The unit can be fabricated in a small (11 inches × 9 inches × 4 inches) lightweight (5 lbs.) and completely portable package.

Because substantially all of the electronic devices making up the terminal system can be manufactured in integrated circuit form, production models of the invention can be made at a relatively low cost when compared with a teletypewriter. These savings can be passed on to the consumer.

The above features are especially attractive to the hearing impaired, particularly when one is faced with the choice between a teletypewriter and a much more advantageous and economical system, in the form of the present invention.

The above-mentioned objects and advantages of the present invention will be more clearly understood when considered in conjunction with the accompanying drawings, in which.

DETAILED DESCRIPTION OF THE INVENTION

Figure 2:
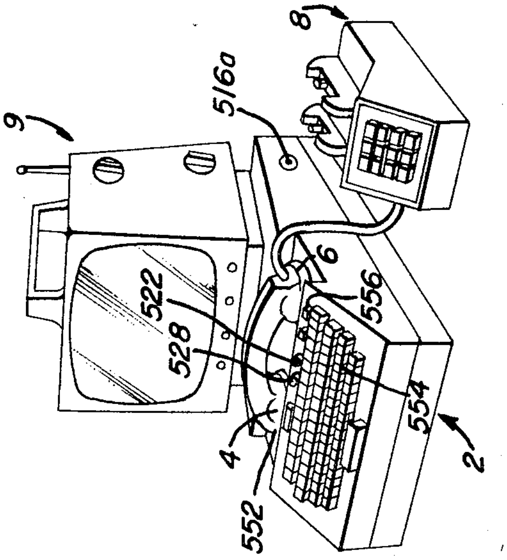
FIG. 2 is a perspective view of the present system including the terminal, television receiver video display, and a telephone.

Referring to the figures, and more particularly FIG. 2 thereof, reference numeral 2 generally describes the terminal package and its keyboard. By depressing the keys, code tones are generated and made available at an acoustic coupler 4 which is integrally located in the terminal 2. A telephone receiver 6 is placed upon the acoustic coupler to allow communication between the terminal 2 and a standard telephone 8. The code is transmitted to another similarly equipped station through voice grade telephone lines, and a response is made manifest by tones at the earpiece of the receiver 6. The acoustic coupler picks up the tones and transmits these tones to the terminal 2 where electronic circuitry decodes the tones and generates alpha-numeric characters on the screen of an ordinary television receiver 9. Means are provided on the keyboard 2 for presenting a display of the typed characters while the terminal is transmitting to another party and vice versa. In this way, the receiver 9 displays the message generated by the parties at both stations.

Referring to FIG. 2, the acoustic coupler 4 is seen to have the external appearance of a telephone receiver cradle for snuggly receiving the ends of the telephone rceiver 6. With reference now to FIG. 1, the cradle has a first-end with a microphone therein as indicated by reference numeral 10. The microphone accepts data from the earpiece end of the telephone receiver 6 (FIG. 2). This data is transmitted to the telephone 8 (FIG. 2) by another party at a similarly equipped station (not shown), via voice grade telephone lines.

In order for the keyboard terminal to communicate data to the other station, FIG. 1 illustrates a speaker 12 for transmitting acoustical data, as generated by the keyboard. The speaker 12 is located in the opposite end of the cradle 4 (FIG. 2) and is acoustically coupled to the mouthpiece end of the telephone receiver 6 (FIG. 2). Thus, data being generated on the keyboard of the terminal may be sent to the other station through the telephone 8 (FIG. 2) after the keyboard depressions have been translated to audio tones.

The microphone 10 has an output that is delivered to the input of amplifier 14 for boosting signal strength. The output of amplifier 14 is fed to a band pass filter 16 where transients and noise are filtered from the signal received from the other station. This signal is then further processed by a frequency discriminator 18 that functions to detect the presence of frequencies corresponding to a binary 1 and binary 0. The frequency discriminator 18 may be characterized as a double tuned linear frequency discriminator as used in FM discriminators. As an alternative, the frequency discrimination could be implemented by using a phase locked loop. At the junction between the band pass filter 16 and the frequency discriminator 18 is a carrier detector 20 that responds to the carrier present when data is being transmitted from the other station. Basically, the carrier detector 20 is a conventional threshold voltage detector. The output of the detector 20 is fed to an AND gate 22 at a first input thereof. A second input of the AND gate 22 is connected to the frequency discriminator 18. Thus, when a proper frequency is detected along with the presence of a data carrier, the AND gate 22 is enabled and data flows through the gate at output line 24.

The following discussion will pertain to the circuitry required to transmit data generated on the keyboard of the terminal.

A frequency shift key (FSK) oscillator oscillates at two distinct frequencies depending upon whether a binary 1 or a binary 0 is selected. The oscillator is a programmable unijunction oscillator of conventional design. Once enabled, the oscillator 26 will generate one or the other frequency to a band pass filter 32 that eliminates harmonics. The output of the filter is connected to the speaker 12 of the acoustic coupler. The speaker developes the acoustic signal representing the character depressed on the terminal keyboard, this signal then being transmitted to the other station through the telephone line.

The following discussion is offered to explain the generation of character codes when keys on the keyboard are depressed.

In FIG. 1, reference numeral 28 generally indicates the circuitry, in block diagram form of the keyboard.

The binary bits of a keyboard character are generated along lead 502. The coded characters conform to the ASCII standard code. The bits appear on lead 502 in serial fashion. Lead 502 is connected to an input of the FSK oscillator 26, previously discussed. As mentioned earlier, this oscillator generates one of two frequencies depending upon whether the input on lead 502 is a logic 1 or logic 0.

The binary code for each character is originally generated by the closure of any one of 52 keyboard switches 34. A conventional type diode matrix 36 has its inputs connected to the key switches. The output of the matrix appears as six code bits or six levels of the standard ASCII code. The seventh bit is generated by gate 38 which has two inputs. The first input is the sixth bit of the diode matrix output. The second input to the gate 38 comes from keyboard gating, along lead 46. The keyboard gating lead is energized when certain keys on the keyboard are depressed. For example, the standard ASCII code contains an upper case character set. When certain keys are shifted, a character such as a bracket will be generated by the diode matrix 36. When such a character is generated, the lead 46 is energized and allows the gated seventh bit to be fed, along with the six code bits from the diode matrix 36, to a parallel to serial converter 44. The output of the parallel to serial converter 44 appears at the lead 502 which as discussed before, carries the serial ASCII code to the FSK oscillator 26.

An additional eighth bit is transmitted to the converter 44 along lead 500. This bit is generated when the terminal detects the presence of a tape recorder jacked into the terminal at the other remote station. This particular feature will be discussed in greater detail hereinafter.

In order to avoid the erroneous generation of a code upon the depression of two or more keys simultaneously, the keyboard circuitry includes a detector 48 having switches 34′ connected to the input thereof. The switches are mechanically coupled with the keyboard key switches 34. The detector 48 sums currents from the switches 34′, and when a threshold is exceeded, the circuit determines that two or more keys have been depressed and as a result, the detector 48 issues a signal to the keyboard strobe inhibit gate 50. This gate transmits an inhibit pulse along lead 52 to the parallel to serial converter 44. When the inhibit gate generates a signal, the parallel to serial converter is prevented from loading and prevents additional flow of information along lead 502.

The parallel to serial converter 44 has an additional input from line 54 which carries a keyboard clock signal that determines keyboard data flow rate. The clock pulses appearing along lead 54 are originally generated from an internal fixed oscillator 504. Pulses from the oscillator 504 undergo frequency division by the frequency divider 60 that is fabricated in the form of an IC chip.

The output from the frequency divider 60 forms the keyboard clock on lead 54.

The serial to parallel converter 62 receives data from lead 502 thru OR gate 66 which are the serial ASCII character codes as generated by key depression or via lead 24 through OR gate 66 which are serial ASCII character codes received from another party. Once received data undergoes serial to parallel conversion at 62, the resultant eight bit character is loaded into an eight bit register 70 which stores one word at a time. Before the word stored in register 70 is shifted out of the register, there must be a detection of a start bit in a data word at bit detector 72. The bit detector 72 has an input connected to the converter input lead 64. The output from the start of data word detector 72 is fed to the clock control 76 which controls the timing for shifting data out of the eight bit register 70. The start bit of a data word is part of the standard ASCII character code developed by the parallel to serial converter 44. The clock control 76 is reset by a control pulse appearing at 506 which is generated by detector 20 when a transient of longer duration than a carrier pulse's detected.

A gate 74 is provided at an input to the serial-to-parallel converter 62. The gate has an input that is coupled to the keyboard clock line 54. The purpose of the gate 74 is to strobe the data line at the midpoint of each data bit. This insures proper transmission of each character between the serial-to-parallel converter 62 and the eight bit register 70.

The detection of the start bit is also important when data is being received from the other station. This detection is done by detector 72. The detector is basically a counter which counts the time interval between the leading edge of the start bit and the midpoint. If the time interval exceeds a preselected value, the start bit is assumed to be valid. However, if the time interval is not exceeded, the start bit is assumed to be invalid and may be a transient or the like. The detector 72, of conventional design, is employed in a wide variety of data communications systems operating with the ASCII code system. The start bit is also detected when it is loaded in the serial-to-parallel converter 62. Thus, when the start bit that is originally loaded in the serial-to-parallel converter is detected at the output, it is known that a complete word has been transmitted from the converter. When the start bit of a data word is detected at the output of converter 62, line 78 is actuated and causes an inhibit of further strobing of the converter 62 through gate 74. The register 70 is then switched to receive the word from the converter 62.

At the same time register 70 receives the word, a mono-stable flip-flop 80 is triggered due to the presence of an enabling pulse on line 78. The flip-flop generates a signal at the output 82 which corresponds to a valid data pulse for loading of the display driver, to be discussed hereinafter. Presence of a pulse on line 82 indicates to the rest of the circuitry that the word has been completely loaded.

The circuitry for converting electrical binary signals to a video display is concentrated within two circuits. The first circuit achieves timing and control and is generally indicated by reference numeral 84. This timing and control circuit is coupled to a memory and video generator generally indicated by reference numeral 86.

As previously discussed, the eight bit register 70 stores a single word at a time. Each word is represented by a six bit code appearing at output lines 88. These lines input to 6 × 256 bit register in the form of a recirculating MOS memory 90. Such a memory is commercially available and is identified as INTEL 1402. The capacity of the memory is chosen so that eight lines of 32 characters per line can be stored. Each character itself is comprised of six bits to conform to the ASCII code. The capacity of the memory constitutes a full "page" in the display format. Data is fed to a line register 92, a line at a time. In order to store a line at a time, the capacity of the register 92 is set at 6 × 32 bits. A line register such as 92 is commercially available and is identified as TMS 3112. Actually, the data fed between the bit register 90 and the bit register 92 must flow through the intermediate gates having a page select enabling input 94. Thus, for a particular "page" of data, all the illustrated gates are enabled in parallel. In order to generate a different page of data, a second bit register such as 90 is employed as a memory for this second page of data. The second memory unit is indicated in phantom by reference numeral 96. As will be seen from the figure, the memory 96 has its own output leads that are gated to the line register 92 through a second set of parallel gates. The enabling signal "page select" is different for the gates at the output of register 90 than it is for the gates appearing at the output of the register 96. Any number of "pages" can be generated as long as this "page" has its own memory, such as 90, 96 and the associated page select gates.

Characters from the line register 92 are ASCII encoded characters and are presented in sequence to the character generator 98 which is a read only memory. The character generator communicates with the line register 92 via six bit lines that define the sequentially delivered ASCII encoded characters. The character generator 98 is identified by its commercial notation TMS 2501.

The video display is constructed row by row until a total of eight rows are displayed on the screen. Each row contains a maximum of 32 characters each constructed from a 5 × 7 dot matrix. The actual construction of each character, per se, is similar to that of disclosed in U.S. Pat. No. 3,685,039. As will be seen in FIG. 1B, three input lines generally shown at 100 provides input sequential addresses between binary "0" and binary "7" to address one of seven lines in a particular character matrix that is to be generated.

The output from the character generator 98 represents the five dots in an addressed line of a generated character. The output is transmitted to a five bit parallel to serial converter 104 via connecting lines 102. A clock input at 106 determines the horizontal bit rate of dots in the character matrix. Returning to the line register 92, a load/recirculate clock 108 is presented thereat to determine the flow of characters sequentially transfered from the output of register 92. The origin of the clock signal 108 will be discussed in greater detail hereinafter.

Video data from the five bit parallel-to-serial converter 104 is transmitted on line 110 to a signal mixer 112 which is a conventional resistive adder where this signal is superimposed with a vertical synchronizing pulse 114, a horizontal synchronizing signal 116, and a third input to the mixer which is a cursor signal that is optional. The horizontal and vertical synchronizing signals 114 and 116 serve as framing signals. The horizontal synchronizing signal 116 is necessary because the video display is generated on a raster scan. Of course, the vertical synchronizing signal is required to generate the data line by line. The optional cursor is a symbol, such as an elevated hyphen which appears on the display as a next character position to be displayed. The cursor is of great value to a machine operator inasmuch as it informs the operator when line feed is required. The output from the signal mixer is a composite of the character video data, horizontal and vertical synch, as well as the optional cursor, fed to an RF oscillator/-modulator 118 through connecting lead 123. The oscillator/modulator 118 shifts the frequency of the mixed signal to the RF range and makes the signal available at the RF output terminal 120.

By employing the RF oscillator 118, it is possible to generate composite video information from the individual signals appearing at the input of the signal mixer and transferring them to the antenna terminals 126 of an ordinary television receiver for display on its screen. This is a primary accomplishment of the invention over the prior art. It is to be emphasized that the composite display can be transmitted to an ordinary television receiver without making connections to, or modifications of the internal circuitry of the receiver. Rather, a simple connection between the terminal 120 and the external terminals of a conventional television receiver is all that is required.

Reference is made once again to FIG. 1 wherein the timing and control circuitry 84 will be discussed in detail. Basically, this circuitry generates horizontal sync and vertical sync signals; shifts out data from the five bit parallel to serial converter 104; and controls the recirculating and loading of memories 90 and 92. In terms of the circuitry employed for timing and control, a phase lock loop is used for master timing.

The phase lock loop consists of a timing chain generator 134, a phase detector 136, a low pass filter 138, and a voltage controlled oscillator 132.

The timing chain generator 134 is a sixteen stage binary counter that generates sixteen bits as indicated. The right-most bit line represents the lowest generated frequency from the counter 134. This lead is fed back to a phase detector 136 where phase angle comparison is made with a standard frequency, such as a 60 HZ line. The detector is of the conventional demodulator type capable of generating an error voltage output that is fed to a low pass filter 138 which includes a charging capacitor. The charging capacitor provides the input to the voltage controlled oscillator 132. This oscillator generates a frequency in accordance with the input presented to it, this input being proportional to the difference in phase between the reference voltage and the fed back voltage present at the phase detector. In turn, the output from the oscillator 132 provides a stable frequency reference to the timing chain generator through connecting lead 140.

A character address counter 142 receives a first input from the data valid line 82. The output from this counter constitutes five bits indicated by reference numeral 150. Another output from the counter 142 feeds an overflow detector 144 which turns on when a particular line has been filled with characters. The overflow detector 144 then communicates with an input to the line address counter 146 to accomplish line counter incrementing. The line address counter 146 has a three bit output as indicated by reference numeral 152. Since the terminal is operating in a typewriter mode of entry, counting of the characters entered is required so that line spillover does not occur.

A comparator 148 compares the bits generated by the character address counter 142 and the line address counter 146 with seven bits from the timing chain generator 134. The function of this comparison is to compare the address of a particular character on a particular line with the address of the main memory 90. The address of this particular character at a particular line is generated by the eight bits from 150 and 152 from the counters 142 and 146. When a comparison exists, a COMPARE signal is generated by the comparator 148. The COMPARE signal is a first input 161 to the gate 154. The second input to gate 154 is a DATA VALID pulse 156 that is inverted by 158. When a character is received from the keyboard or coupler, and a COMPARE signal exists, a pulse is generated on line 162 which switches the memory 90 from a normally recirculating mode to a load mode.

An additional timing control is provided by the LOAD/RECIRCULATE unit 160 which causes shifting of memory 92 between load and recirculate modes. When in a load mode, data is transferred between memories 90 and 92. Shifting occurs between modes once for each character row because the characters are dumped by 90 and loaded into 92 on a character line by line basis for every sixteen traces of raster scan under control of RCIR signal on line 164.

Additional features which make the present invention particularly amenable as a communication system for the hearing impaired will now be discussed.

As two persons are creating messages at their respective stations, the system must provide a carriage return and line feed for the visual display. In order to effect this, a gate 508 shown in FIG. 1A has six inputs connected to the outputs of the eight bit latch register 70. The output from this gate is indicated at 510 and represents a line that is actuated when a space character is detected by the gate 508. Line 510 is introduced as an input to the gate 511, shown in FIG. 1B, which has two additional inputs connected to the third and fourth bit lines of the character address counter 142. The gate 511 detects character addresses that are equal to or greater than the 24th character position on a line. The visual display has a format of 32 maximum characters to a line. When the gate 511 detects the coincidence of an end of line condition (the 24th character has been entered) and a space character is fed to the gate 511 through line 510, the overflow detector 144 is triggered through line 512. Triggering results in carriage return and line feed.

As an additional feature, the present system can operate so as to display alpha numeric data from a prerecorded tape. Also, output connections from the system are provided so that an external tape can be recorded with data generated from the terminal keyboard. Referring to the upper left corner of FIG. 1A, there will be seen a jack 514 which permits the system to input from an external tape recorder. With serially connected switch 556 closed, the data from the external tape recorder will enter the terminal at the input to amplifier 14. Thereafter, the data will be displayed as previously discussed in connection with data received through the microphone 10 of the acoustic coupler. The line 514 is also introduced as an input to the band-pass filter 32. Consequently, with switch 554*a* closed, the program material from the external tape recorder will be played out from the speaker 12 and then to the phone lines for receipt by the other station.

It is possible to record onto tape by tapping the output of the FSK oscillator 26. The purpose of tapping off from this oscillator is to recreate a "high fidelity" pulse train from data that is received through the microphone 10. The reconstituted pulses repeat the data. However, the individual pulses are reshaped to minimize signal degradation.

A survey amongst the hearing impaired indicates a strong desire on the part of this population to have a visual indication when the party they are communicating with is recording the communication between stations. Accordingly, as seen in FIG. 2, a light 522 is provided for signalling this occurrence. With respect to the electronics for accomplishing the signal indication, reference is made to FIG. 1A wherein line 500 is connected to contacts 516*a* of the "Record Onto Tape Jack" 516. These contacts are closed when a tape recorder plug is inserted into the jack. As a result of the contact closure, the eighth bit of the pulse train from parallel to serial converter 44 becomes a logic 1, the eighth bit being subsequently transferred through converter 62 and latch 70 for subsequent energization of indicator lamp 522, via lead 518. The latches 70 of both stations are actuated so that both parties can realize the connection of a tape recorder by one of the parties. The physical location of lamp 522 is shown in FIG. 2.

Figure 1A:
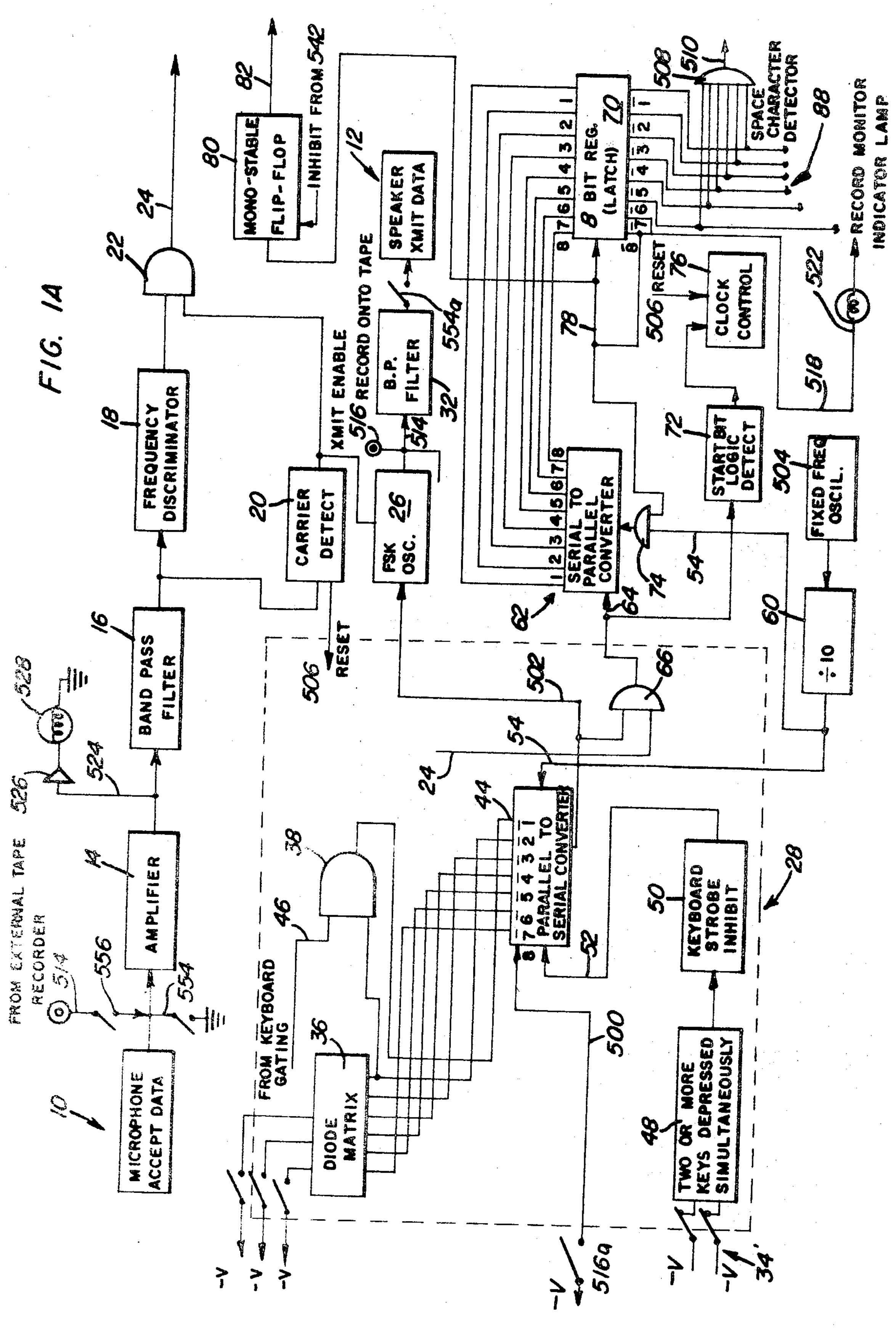
FIGS. 1A and 1B are block diagrams of the circuitry contained in the terminal of the present invention.

It is exceedingly important for a calling party to be given information with regard to the status of phone lines when he places a call. Persons with normal hearing rely upon dial tones, busy signals, ringing signals, and other audio tones to make them aware of whether a call can be completed. Because the deaf caller is unable to make this audio determination, he must relay upon a visual indication. In the present invention, a phone line status lamp indicator 528 is mounted on the keyboard and merely converts to light, the tone intervals that a normal person hears. A light 528 is illustrated in FIG. 2 to be conveniently placed on the keyboard for easy sighting. Circuitwise, FIG. 1A illustrates the lamp 528 to be connected to the output of amplifier 14 through a connecting lead 524 and serially connected driver 526.

From a marketing point of view, the present terminals may be leased to users on a utilization basis. Accordingly, it is necessary to determine the degree of utilization made by the terminal so that the customer can be billed in accordance with use. In a preferred embodiment of the present invention, utilization is monitored by a combination of key stroke entries as well as time on line. After a predetermined number of key strokes have been entered, the user is cautioned to call a central operator for clearance to continue using the terminal. When such a request is made to a central operator, she may check the account of the user and grant continued use. To do so, she generates a special code which is transmitted to the terminal and resets a utilization monitor. However, if a user fails to keep his account timely, after he is cautioned, he may make a small number of additional keystroke entries. After a second predetermined keystroke count, the utilization monitor causes the terminal to shut down. In such an event, it is not until a central operator generates the special code that the unit can be used again.

Figure 3:
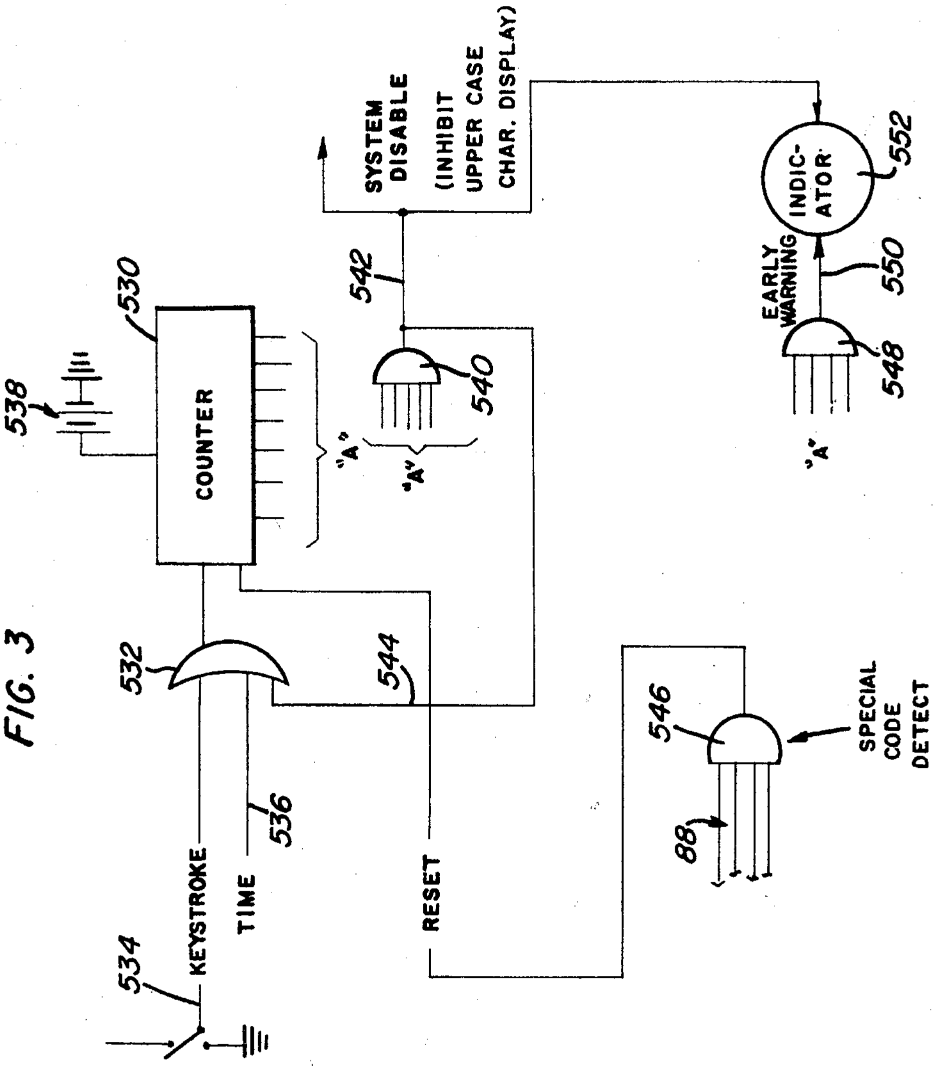
FIG. 3 is a logic diagram of a utilization monitor that is capable of monitoring usage, and terminating system operation after a predetermined time and an actual usage rate has been exceeded. The utilization monitor has the capability of being reset from a remote location or central station.

Reference is made to FIG. 3 which illustrates the logic diagram for the utilization monitor. Reference numeral 530 indicates a conventional digital counter having a plurality of output bits, the number of which are defined by the maximum count desired. The counter is stepped by a combination of key stroke inputs and a time input. A switch 534 is mechanically coupled with each key on the keyboard for commensurate closure therewith. Thus, each time a key stroke is entered, a pulse input is generated for input to gate 532. Time line 536 is connected to a slow repetition rate oscillator (not shown) which generates pulses at a relatively slow rate, such as one pulse for each 1.6 seconds. Each time there is a pulse on the time line, the gate 532 steps the counter 530 by an additional increment of one. A battery 538 is connected to the counter to maintain power even if external power is turned off. Thus, the count in counter 530 is non-destructible.

When a pre-selected count is generated by the counter 530, the gate 548 issues an "early warning signal" on line 550. This causes a visual indicator 552 to display the "early warning" condition. This condition warns the user that he should call the central operator and obtain clearance for continued use of the terminal. The indicator may be a lamp, or in the preferred embodiment of the invention, the indicator is a meter 554 having two regions. The first region indicates the "early warning" condition and the second region indicates the terminal shut-off condition. FIG. 2 illustrates the location of the meter on the keyboard.

By using the keyboard, a user calls the central operator and requests clearance, whereupon the central operator will check the user's account. If the account is up-to-date, the operator will generate a special code which becomes stored in the terminal latch register 70 (FIG. 1A). The code is detected by the special code detect gate 546 (FIG. 3), that generates an output along the reset line when the special code is detected. As a result, the utilization monitor 530 is reset and the utilization cycle begins again.

However, if the user ignores the early warning indicator and fails to receive clearance from the central operator, the counter 530 continues to count until a second, greater count is tallied. At this point, gate 540 is triggered to generate a system disable pulse on line 542 which is transferred to a second input of the meter 552. As a result, the delinquent terminal is inhibited from displaying upper case characters, necessary for communication. However, the terminal remains receptive to received communication thereby permitting clearance from the central operator at any time. When disabled, the meter 552 indicates the disabled or shut-down condition. At the same time, a line 544 connects the output from gate 540 to a third input of gate 532 which has the function of disabling the counter.

Figure 1B:
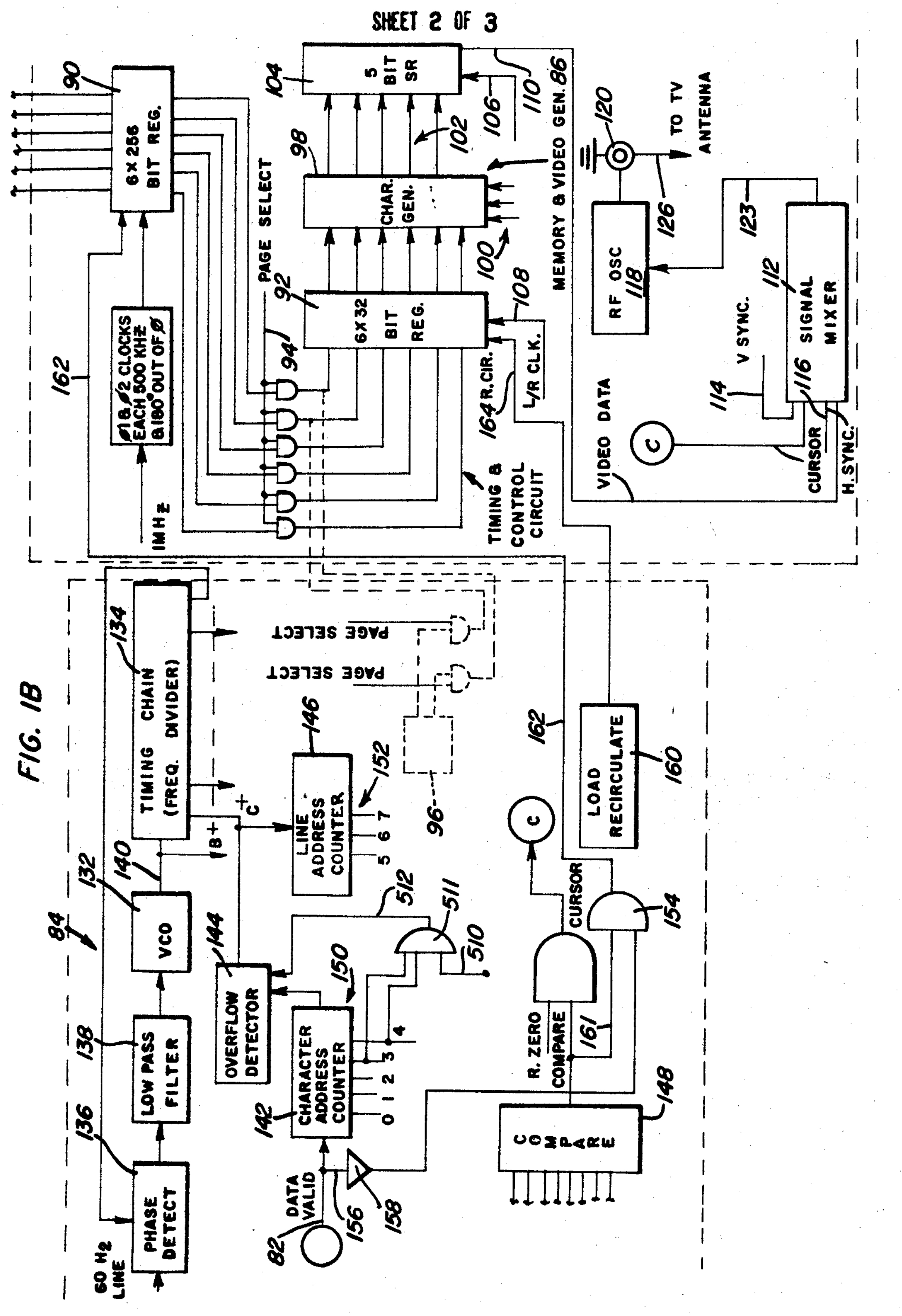

In order to appreciate how the circuitry as illustrated in FIG. 1A disables generation of upper case letters when the terminal is shut-down, attention is directed to the flip-flop 80 that receives an inhibit pulse from line 542 (FIG. 3). As a result, data valid signals cannot be generated from the flip-flop along line 82. Inasmuch as this data valid pulse from line 82 is required to operate the circuitry as shown in FIG. 1B, the terminal will cease displaying data.

The present terminal may be used to record a tape while data is being generated by the keyboard. This has been discussed in connection with the "Record Onto Tape" output jack 516 of FIG. 1A. When the system is used in this mode, the phone is not placed on the coupler. Therefore, if means were not provided otherwise, the speaker 12 would generate beeps that would be annoying to nearby persons with normal hearing. Accordingly, a switch 554 is provided to remedy the situation. The switch is shown in FIG. 1A and its physical location on the terminal is shown in FIG. 2.

The switch is a double throw switch which has a remote position that enables the terminal to operate in its usual manner. The second position of the switch causes the system to operate in a local mode. In this mode, switch 554 is closed thereby shorting the amplifier 14 input to ground. In addition, a second set of contacts 554a opens the connection between the filter 32 and the speaker 12.

A switch 556 is provided on the keyboard as shown in FIG. 2. The purpose of this switch is to permit playback, through the system, of source material from an external tape recorder. The jack for this tape recorder was previously discussed in connection with reference numeral 514. The switch 556 is a double throw switch. In the first, normal position of the switch, both sides of a communication can be recorded from jack 516 shown in FIG. 1A. In this position, the switch remains normally opened. If, on the other hand, the switch is positioned to its play position, switch 556 is closed and the playback of prerecorded tape material from an external tape recorder can take place through jack 514.

Thus described, it will be apparent that the present invention offers the hearing impaired great advantages over prior art systems.

It should be understood that the invention is not limited to the exact details of construction shown and described herein for obvious modifications will occur to persons skilled in the art.

Wherefore we claim the following:

1. A telephone communication system for the hearing impaired, the system having at least two communication stations, each station comprising:

an acoustic coupler for operating with a telephone receiver;

means connected to the coupler output for generating electrical message signals in response to a telephone message received from another station;

means connected to the output of the generating means for encoding the electrical message signals into an electrically coded signal;

means connected to the output of the encoding means to translate the coded signals into signals representing a plurality of respective character dot matrices;

circuit means for connecting the translated matrix signals to a signal mixer where a carrier signal is modulated by the translated signals;

means for connecting vertical and horizontal synchronizing signals to the mixer;

means connected to the output of the mixer for converting the mixed signal to the RF region;

output means connected to the output of the converting means to permit direct connection of the system to the antenna of a conventional TV;

whereby a row by row display of the received message can be effected;

a keyboard for entering a message at one station to be transmitted to the other station;

means connected to the keyboard for encoding the message in the form of a coded signal;

means connected to the encoding means and responsive to the coded signal for generating audio tones, coupled by the acoustic coupler, to a telephone for transmitting the message to the other station;

counter means for monitoring utilization of the keyboard as the keyboard is actuated, as well as the elapsed time said one station is in actual use and power is on;

means connected to the output of the counter means for indicating to the user a first count condition;

means connected to the output of the acoustic coupler and responsive to receipt of a special reset code from another party, for resetting the counter means; and means connected to the counter means for disabling said one station's output means if the reset does not occur and the counter reaches a second count condition.

2. The structure of claim 1 wherein the counter means is incremented by OR gating of key strokes from the keyboard and the output from a relatively low frequency oscillator.

3. The structure of claim 1 wherein circuit means are connected between the keyboard and an external tape recorder for effecting the recording of a message as it is entered on the keyboard.

4. The circuitry set forth in claim 1 wherein circuit means are connected between the means for generating electric message signals and an external tape recorder for recording all communication transmitted and received at a station.

5. The structure defined in claim 4 together with means for detecting the connection of a tape recorder in the system at said one station and issuing a visual warning thereof at said other station.

6. The circuitry stated in claim 1 together with indicator means connected in circuit with the output of the acoustic coupler for visually indicating the condition of the phone lines when a call is being placed.

7. The structure defined in claim 2 wherein the counter means includes:

a first gate having one input connected to the keys of the keyboard;

a second input connected to the low frequency oscillator, whereby a pulse at either input turns the gate on;

a binary counter responding to the gate each time it turns on;

a second gate connected to the output of the counter for actuation when a first preselected count is obtained;

indicator means connected to the second gate to indicate when the first preselected count is attained;

a third gate connected to the output of the counter for actuation when a second preselected count is attained;

another indicator means connected to the third gate to indicate when the second preselected count is attained; and a reset line connected to the counter for resetting the counter to its starting count.

* * * * *